F. M. Holmes,

Folding Chair.

No. 4,280. Reissued Feb. 28. 1871.

Witnesses.

S. N. Piper

L. N. Mosell

Francis M. Holmes.

by his attorney

R. H. Eddy

N. PETERS, PHOTO-LITHOGRAPHER, WASHINGTON, D. C.

United States Patent Office.

FRANCIS MARCH HOLMES, OF BOSTON, MASSACHUSETTS.

Letters Patent No. 111,455, dated January 31, 1871; reissue No. 4,280, dated February 28, 1871.

IMPROVEMENT IN FOLDING-CHAIRS.

The Schedule referred to in these Letters Patent and making part of the same.

*To all persons to whom these presents may come:*

Be it known that I, FRANCIS MARCH HOLMES, of Boston, of the county of Suffolk and State of Massachusetts, have invented a new and useful Improvement in Folding-Chairs; and do hereby declare the same to be fully described in the following specification and represented in the accompanying drawing, of which—

Figure 3:
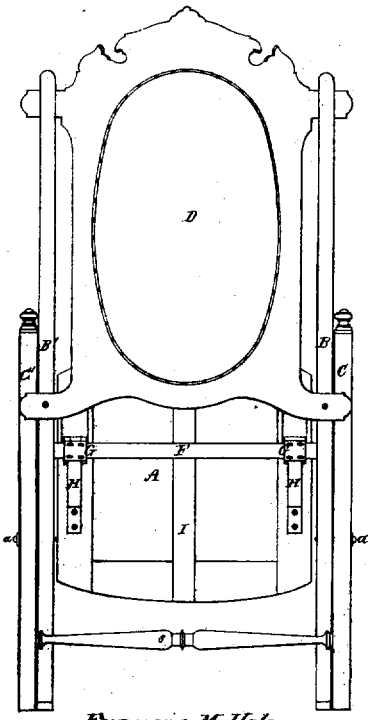

Figure 3 a rear elevation of it as folded.

The main features of the folding-chair as improved by me consist in a seat, A, two sets of crossed levers, B B′ C C′, a back, D, and two supporting seat-rungs, E F.

The longer levers B B′ are crossed on the shorter ones C C′, and pivoted thereto, the pivots being shown at *a a*.

Furthermore, the longer levers are disposed between and against the shorter levers, those of each pair being connected by one of the seat-supporting rungs, and also by one of two other rungs, *r s*, arranged as shown.

In this chair the seat is joined to the back rung F by two double-jointed or three-leaved hinges, G G, so that, while falling toward or into a vertical position, such seat shall turn over and down in front of the front rung E.

When the seat is horizontal, or in a position to be sat upon, one or more hooks or stops, H, extended down from it, bear against the front rung, and thus serve to support the parts of the chair in the proper positions for the chair being used by a sitter.

Figure 4:
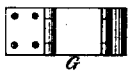

Figure 4 is a top view, and

Figure 5:
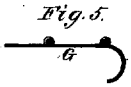

Figure 5 an edge view of one of the double-jointed or three-leaved hinges.

The hooked leaf of each hinge is to be fastened to the rung F, the other outer leaf being fixed to the chair-seat.

Figure 1:
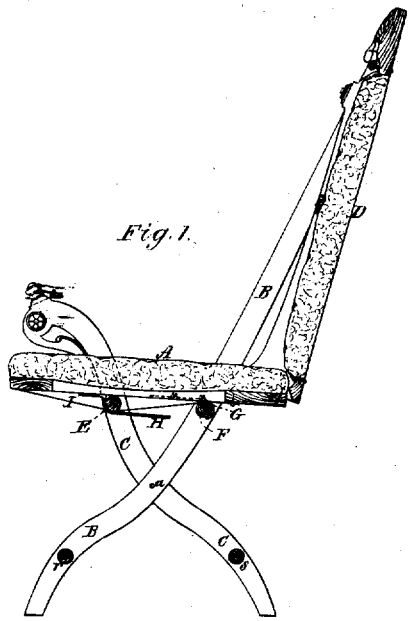
Figure 1 is a vertical section of one of my improved chairs in an unfolded state ready for use.
Figure 2:
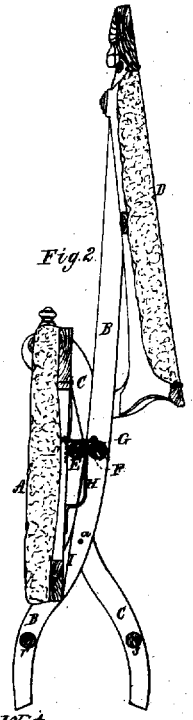
Figure 2 is a vertical section.

Furthermore, there is fastened to the chair-seat, on its under side, and at or near its middle, a band or webbing, I, which extends underneath the rung E and over the rung F, when the chair is open or unfolded, or its parts in position, as shown in fig. 1, for the chair to be sat upon. The said band, at or near its ends, is to be fastened to the chair-seat. This band is to prevent the seat, while the chair is folded, from being turned up against the back, for should this be done, and an attempt be made to unfold the chair, the whole chair would be liable to collapse in a manner to cause it to fall to the floor.

The object in having the seat combined with the back rung by the double-jointed hinges, and arranged so as to turn over and down in front of the front rung, is to have the upholstered or cushioned face or cushion of the seat show in front with the back when the chair is folded.

When the seat is connected to the front rung by three-leaved hinges down over, and is folded in rear of the back rung, the bottom of the seat or lower surface of the seat will be seen with the front of the back when the chair is folded, thereby causing the best or most ornamental side or face of the seat to be hidden from view.

Folding-chairs, as usually constructed, when folded, require to lean against some object in order to sustain them from falling. In my present chair, as shown in the drawing, the legs, or those parts of the levers B B′ C C′ which are below the pivots at the crossings of such levers, are made of equal length, and the seat-supporting rungs are arranged and the seat applied to one of them in manner as described, so that the seat, while the chair is being folded, shall move forward over and drop in front of the front rung, instead of folding back over and down in rear of the back seat-supporting rung.

Thus it will be seen that the parts of the chair fold together somewhat differently from what corresponding parts do in the chair as represented in the United States patent No. 111,209, dated January 24, 1871, and granted to me; also that the seat, the back, and the crossed levers, and their pivots, are so constructed and arranged, as shown in the drawing, that when the chair is in a folded condition, with its four feet resting on a floor or plane, horizontal, or about so, it will "stand alone," or, in other words, maintain its erect or standing position without extraneous or other aid, the line of direction, or vertical from the center of gravity, falling within the base or rectangle contained within the feet of the legs.

In the folding-chair as described,

I claim—

1. The seat, as connected to its back-supporting rung F by double-jointed hinges G, and provided with one or more stops, H, to sustain it against the front rung E, such seat being to fold over the front rung and down in advance of it, as set forth.

2. In the folding-chair, the combination of the band I with the seat and its supporting-rungs E F, and one or more stops, H, and with the three-leaved hinges G fixed to the seat and the back rung F, all being substantially as described.

3. In a folding-chair, as made or composed of a back, D, a seat, A, and two crossed sets of levers, B B′ C C′, pivoted together substantially as set forth, the seat A arranged and combined with the longer set of levers or a rung thereof, and a seat-supporting rung, E, of the shorter set of levers, in manner so that such seat, during the act of folding the chair, shall move or slide forward on or over and drop more or less below or in front of the said rung E, so as to have the top or sitting surface of the seat in front of and the bottom surface of the seat next to the said rung E, as described, the same being in order to show the upholstered or sitting surface of the seat in front with the front of the back of the chair when the chair is folded.

4. A folding-chair, composed of a back, D, two sets of crossed levers, B B′ C C′, and a seat, A, arranged and combined so that when the chair may be folded the supports of the seat shall be between the seat and the back, substantially as represented.

5. A folding-chair, composed of a back, D, two sets of crossed levers, B B′ C C′, and a seat, A, arranged and combined substantially as described, so that when the chair may be folded the supports of the seat shall be between the seat and the back, and the chair be self-sustaining, as set forth, when its four feet may be resting on a floor, as explained.

F. M. HOLMES.

Witnesses:
R. H. EDDY,
J. R. SNOW.